United States Patent
Asai et al.

Patent Number: 5,903,730
Date of Patent: May 11, 1999

[54] METHOD OF VISUALIZING RESULTS OF PERFORMANCE MONITORING AND ANALYSIS IN A PARALLEL COMPUTING SYSTEM

[75] Inventors: Noboru Asai; Tohru Matsumoto, both of Shizuoka; Kazuo Watanabe, Numazu, all of Japan

[73] Assignee: Fujitsu Limited, Kawasaki, Japan

[21] Appl. No.: 08/800,381

[22] Filed: Feb. 14, 1997

[30] Foreign Application Priority Data

Aug. 23, 1996 [JP] Japan .................................. 8-222012

[51] Int. Cl.⁶ ...................................................... G06F 9/22
[52] U.S. Cl. .................. 395/200.54; 395/200.53
[58] Field of Search ........................ 395/200.54, 182.18, 395/182.19, 200.53; 702/186, 179

[56] References Cited

U.S. PATENT DOCUMENTS 5,491,779  2/1996  Bezjian ..................................... 345/440
5,684,945  11/1997  Chen et al. ......................... 395/182.18
5,764,537  6/1998  Walter et al. ............................ 702/179

FOREIGN PATENT DOCUMENTS 5-2508  1/1993  Japan .

Primary Examiner—Ellis B. Ramirez
Assistant Examiner—William Titcomb
Attorney, Agent, or Firm—Staas & Halsey

[57] ABSTRACT

A method of visualizing the results of performance monitoring and analysis for a parallel computing system in which a plurality of processors execute a parallel processing program composed of a plurality of routines. First, information on the execution time of each routine is collected in a realtime manner while the program is concurrently executed by the plurality of processors. Second, a maximum, average, and minimum values of the execution time of each routine are calculated, based on the information collected for the plurality of processors. Third, the collected information is summarized as an execution profile and displayed in graphical form by using bar graphs, pie graphs, or radar charts. For each procedure or program loop, the present method clarifies the percentages of net user program execution, communication, synchronization, and other parallelization overheads, as well as indicating their deviations. This feature helps the user to understand the actual program behavior and to tune up the parallel processing program.

11 Claims, 18 Drawing Sheets

FIG. 3

| RUN-TIME SUBROUTINE | INVOKED AT | PRIMARY FUNCTIONS |
|---|---|---|
| #1 | BEGINNING OF PROGRAM | INITIALIZE LOCAL DATA AREA |
| #2 | BEGINNING OF PROCEDURE | RECORD EXECUTION START TIME OF EACH PROCEDURE |
| #3 | END OF PROCEDURE | ACCUMULATE EXECUTION TIME OF EACH PROCEDURE |
| #4 | BEGINNING OF LOOP | RECORD EXECUTION START TIME OF EACH LOOP |
| #5 | END OF LOOP | ACCUMULATE EXECUTION TIME OF EACH LOOP |
| #6 | BEGINNING OF PARALLEL PROCESSING LIBRARY ROUTINE | RECORD EXECUTION START TIME OF EACH ROUTINE |
| #7 | END OF PARALLEL PROCESSING LIBRARY ROUTINE | ACCUMULATE EXECUTION TIME OF EACH ROUTINE |
| #8 | END OF PROGRAM | SUMMARIZE EXECUTION TIME DATA AND OUTPUT PROFILE INFO FILE |

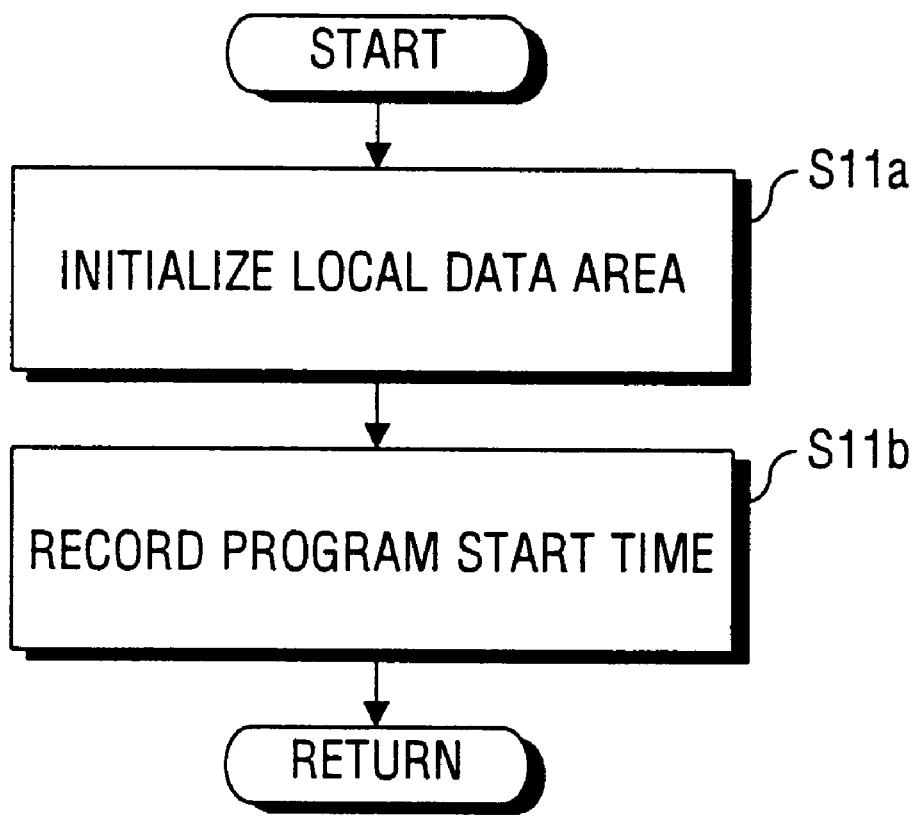

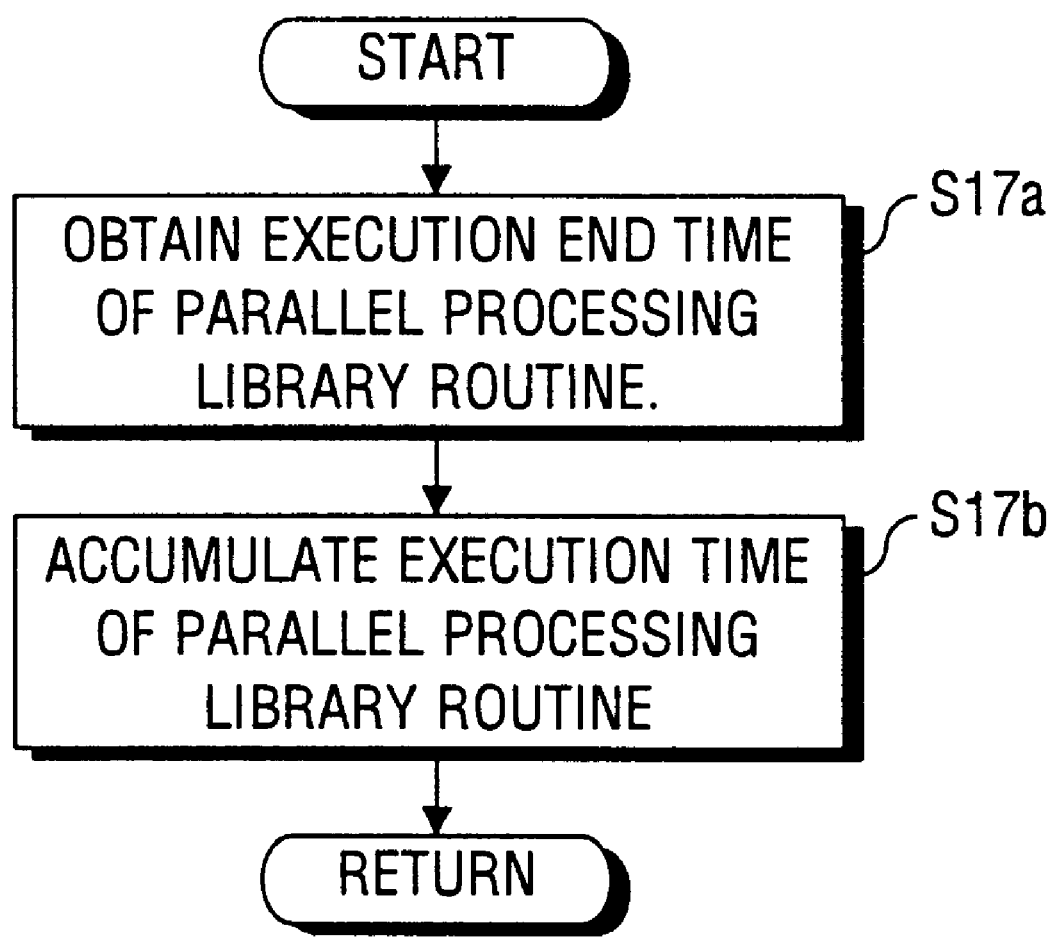

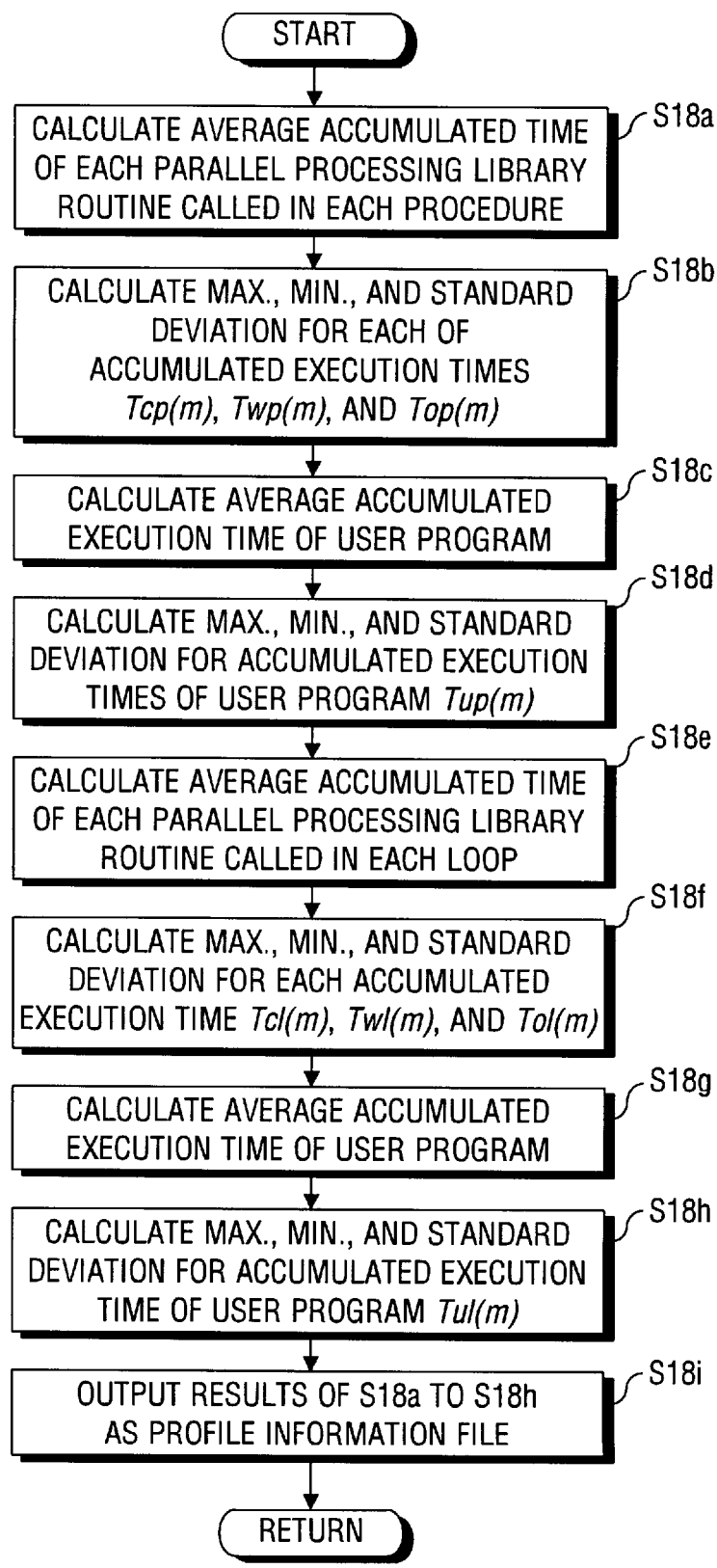

FIG. 12

| SUBJECT OF PROFILING | PREPARATORY PROCESS STAGE | START-UP PROCESS STAGE | TERMINAL PROCESS STAGE |
|---|---|---|---|
| PROCEDURE | | • EXECUTION START TIME | • ACCUMULATE EXECUTION TIME OF EACH PROCEDURE<br>• ACCUMULATE EXECUTION TIME OF EACH PARALLEL PROCESSING LIBRARY ROUTINE CALLED BY THE PROCEDURE |
| LOOP | | • EXECUTION START TIME<br>• LOOP COUNTER INITIAL VALUE<br>• LOOP COUNTER STEP SIZE | • ACCUMULATE EXECUTION TIME OF EACH LOOP<br>• ACCUMULATE THE NUMBER OF ITERATIONS<br>• ACCUMULATE EXECUTION TIME OF EACH PARALLEL PROCESSING LIBRARY ROUTINE CALLED BY THE PROCEDURE |
| PARALLEL PROCESSING LIBRARY ROUTINE | | • EXECUTION START TIME | • ACCUMULATE EXECUTION TIME OF EACH ROUTINE |

40

PROCEDURE #1

PROCEDURE #2

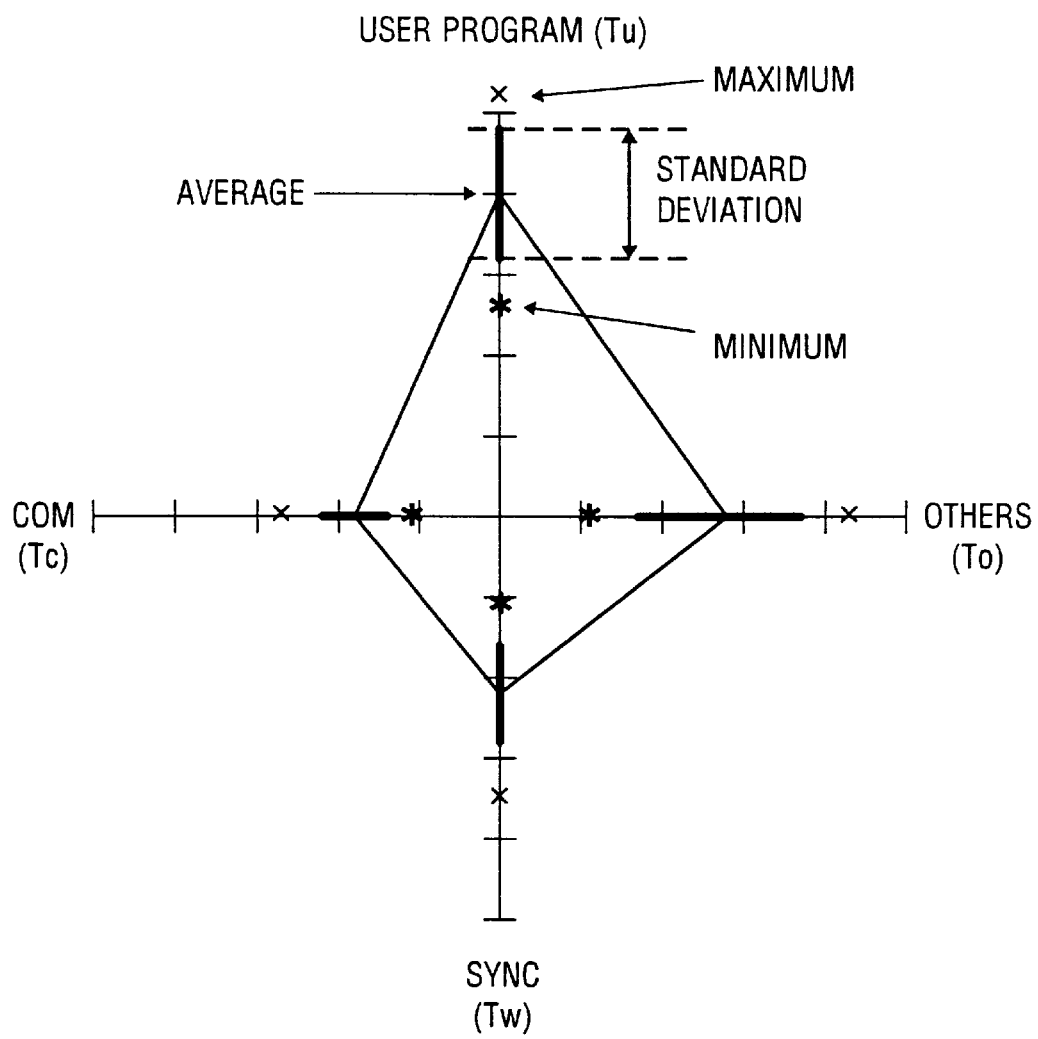

METHOD OF VISUALIZING RESULTS OF PERFORMANCE MONITORING AND ANALYSIS IN A PARALLEL COMPUTING SYSTEM

BACKGROUND OF THE INVENTION

1. Field of the Invention

The present invention relates to a method of visualizing the results of performance monitoring and analysis in a parallel computing system employing a plurality of processors, and more specifically to a method of visualizing the results of performance monitoring and analysis in a more convenient and comprehensive way. The present invention relates also to a computer-readable medium encoded with a computer program in which the foregoing method is implemented.

2. Description of the Related Art

Parallel processing techniques play a crucial role in meeting the increasing demands of today for high-performance computing systems. A parallel computing system executes an application by using multiple processors that run in parallel, thereby yielding high processing throughput. Development of software for a parallel computing system, however, generally involves some difficulties in program debugging, evaluation, and performance tuning because of its complex nature.

To solve the problem, performance analyzers are introduced as a convenient tool that helps software programmers in monitoring the behavior of a parallel program under test and measuring its performance. The analyzer digests the collected data and presents the result to the user as a summarized execution profile.

One conventional performance analyzer provides execution profile of individual processors, which is summarized in such a way that the total processing time is classified into some categories including net operating time and idle time, etc. Execution profile of each processor is separately represented in the form of bar graph or the like.

This conventional method of displaying execution profiles, however, is not convenient for the software development engineers at all when the parallel processing system contains hundreds of processors. Information displayed on an analyzer screen is too enormous for them to properly understand the program behavior, since so many processors are running in parallel. In such a case, the conventional analyzer can somewhat ease the difficulty by applying some statistical processing to the captured raw data. This allows the overall program behavior or average performance of the processors to be presented to the engineers in a more comprehensive way.

However, the information provided by this conventional performance analyzer is not sufficient for the software development engineers to fully understand the system performance and the detailed relationship between the processes running in parallel.

SUMMARY OF THE INVENTION

Taking the above into consideration, a first object of the present invention is to provide an improved method of visualizing the results of performance monitoring and analysis in a parallel computing system, which shows percentages of net user program execution, communication, synchronization, and other parallelization overheads, as well as indicating their deviations.

It is a second object of the present invention to provide an improved method of visualizing the results of performance monitoring and analysis in a parallel computing system, which allows the user to evaluate software routines in a parallel processing program through a straightforward and convenient graphical representation of the execution profile.

To accomplish the above object, according to the present invention, there is provided a method of visualizing results of performance monitoring and analysis for a parallel computing system in which a plurality of processors execute a parallel processing program composed of a plurality of routines. The method comprises the following steps:

(a) collecting information on execution time of each routine being executed concurrently by the plurality of processors, in consideration of classification of the routines;

(b) obtaining a maximum value, an average value, a minimum value, and standard deviation of the execution time of each routine, based on the information collected for the plurality of processors; and (c) graphically displaying execution profile information including the maximum value, the average value, the minimum value, and the standard deviation of the execution time of each routine.

Particularly to accomplish the second object described above, there is provided a method of visualizing the results of performance monitoring and analysis for a parallel computing system. The method displays execution profile information in the form of bar graphs, pie graphs, or radar charts.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a table summarizing run-time subroutines provided for performance monitoring and analysis;

FIG. 4 is a flowchart describing functions of run-time subroutine #1;

FIG. 10 is a flowchart describing functions of run-time subroutine #7;

FIG. 11 is a flowchart describing functions of run-time subroutine #8;

FIG. 12 is a table summarizing information to be collected by the performance analyzer system of the present invention;

FIG. 16 is a diagram showing a fourth example of execution profile display, in which the execution profile is represented in a radar chart;

DESCRIPTION OF THE PREFERRED EMBODIMENT

An embodiment of the present invention will be described below with reference to the accompanying drawings.

Figure 1:
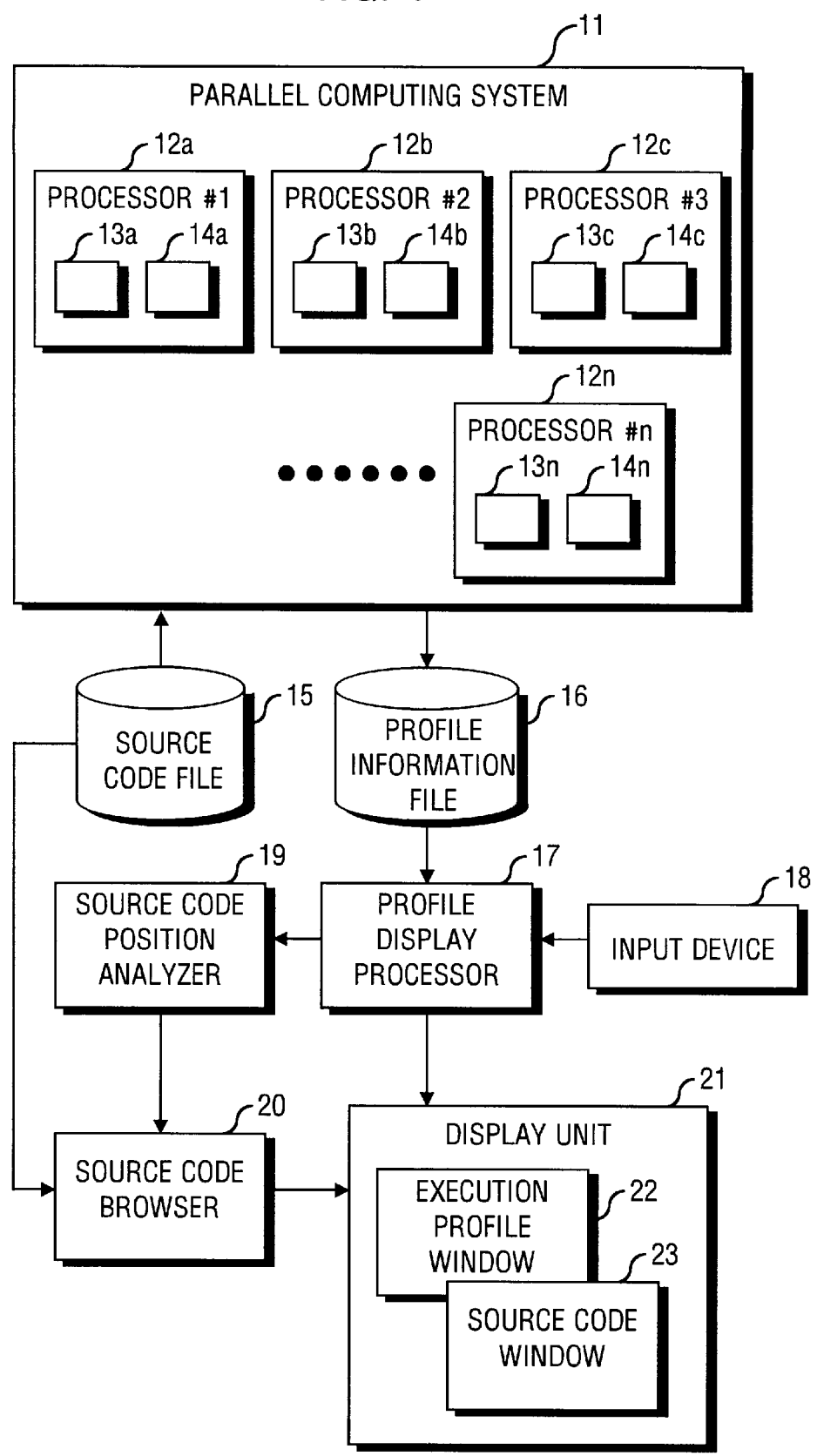
FIG. 1 is a conceptual view of a performance analyzer system which employs a visualization method according to the present invention.

FIG. 1 is a conceptual view of a performance analyzer system in which a visualizing method according to the present invention is implemented. A parallel computing system 11 is constructed by a plurality of processors 12a–12n serving as computing elements which run together to achieve massive computational tasks encoded in a parallel processing program. Those processors 12a–12n individually comprise data collection means 13a–13n and data summarization means 14a–14n for correcting and summarizing execution time data, respectively.

The data collection means 13a–13n collect, in a realtime manner, execution time data during program execution in the respective processors 12a–12n where they reside. The execution time data collected by the data collection means 13a–13n are used as source data for execution profiles. Execution profiles are a set of reports which will provide the users with information about how the processors 12a–12n are actually working, thereby allowing them to evaluate the program from various viewpoints.

Execution profiles refer to some particular program routines that formulates the parallel processing program, such as procedures, loops, parallel processing library, which are monitored and analyzed by the performance analyzer system. In this sense, those routines are referred to as subjects of profiling, or profile subjects.

The data summarization means 14a–14n summarize the execution time data collected by the data collection means 13a–13n. More specifically, they calculate a maximum, average, minimum values and standard deviation of the accumulated execution times for each routine, or each subject of profiling. To achieve those tasks, it is necessary to compile all the execution time data collected by the data collection means 13a–13n at a single point. Therefore, one of the data summarization means, say 14a, takes charge of the summarization tasks and the others 14b–14n simply send their data to this data summarization subroutine 14a using inter-processor communication paths (not shown) in the parallel computing system 11.

In reality, the above-described data collection means 13a–13n and data summarization means 14a–14n are implemented in the parallel computing system 11 as a set of subroutines provided as part of the run-time library for parallel processing. In the present embodiment, eight run-time subroutines are available for this purpose, as listed in FIG. 3. Detailed functions of the data collection means 13a–13n and data summarization means 14a–14n will be described separately, with reference to FIG. 4 to FIG. 11.

Referring back to FIG. 1, the parallel computing system 11 is coupled to two data files: a source code file 15 and a profile information file 16. The source code file 15 contains the original source code of a program to be executed by the processors 12a–12n. The profile information file 16 stores execution time data and their summary data acquired from the processors 12a–12n.

A profile display processor 17 analyzes the contents of the profile information file 16 and displays the result of this analysis in an execution profile window 22 on a screen of a display unit 21. Here the profile display processor 17 visualizes the result of the analysis using several graphical presentation techniques as will be described later in FIG. 13 to FIG. 18. An input device 18 is used to enter some instructions or data to the profile display processor 17.

Using this input device 18, the user of this performance analyzer system can designate a specific item (e.g., a procedure or loop) displayed in the execution profile window 22. A source code position analyzer 19 searches the source code to find the code position (or line number) corresponding to the item designated by the user. According to the code position information provided by the source code position analyzer 19, a source code browser 20 extracts the relevant part of the source code 15 and shows the extracted source code in a source code window 23 on the screen of the display unit 21.

Before starting program execution in the above described system, it is necessary to translate, or compile, the original source code into an executable program. In the present invention, the source code should be modified prior to the compilation, for monitoring and measuring purposes. More specifically, the compilation system inserts some subroutine call statements into the source code to invoke some run-time subroutines for data collection and summarization at appropriate points in the program.

The source code of a parallel processing program has a hierarchical structure. The program, or user application, consists of a plurality of procedures. A procedure call some other procedures; in other words, procedures can be nested. As a matter of fact, the main body of the program is a procedure implicitly named as "MAIN," which contains several child procedures. Loop is a sequence of instructions as part of a procedure which are executed iteratively.

To support parallel program execution, the system provides a library of routines to perform process communication, synchronization, and other tasks inherent in parallel processing. They are referred to as parallel processing library routines, which are called by procedures as needed. Since they will affect the system performance as parallelization overheads, the parallel processing library routines are important subject of execution profiling.

Figure 2:
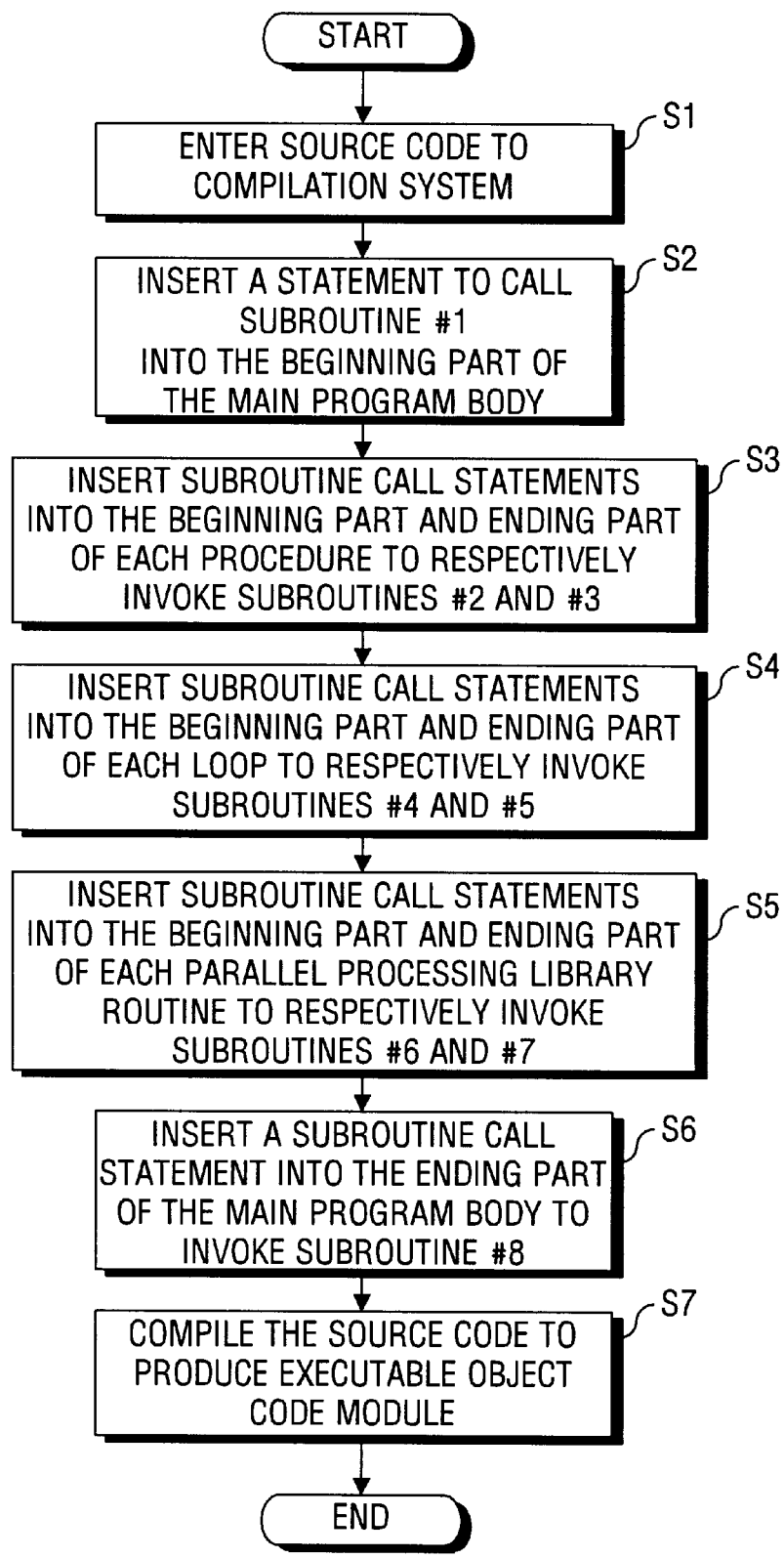
FIG. 2 is a flowchart showing a process of modifying and compiling a program written for a parallel processing system.

FIG. 2 is a flowchart showing a process of modifying and compiling a program for the parallel computing system 11. This process includes the following seven steps.

[S1] Source code of a parallel processing program, which is to be executed in each processor in the parallel computing system 11, is entered to the compilation system.

[S2] A statement to call run-time subroutine #1 is inserted into the beginning part of the main program body. This run-time subroutine #1 records the time when the program is started.

[S3] Statements to call run-time subroutines #2 and #3 are respectively inserted into the beginning part and ending part of each procedure contained in the source code.

[S4] Statements to call run-time subroutines #4 and #5 are respectively inserted into the beginning part and the ending part of each loop contained in the procedures.

[S5] Statements to call run-time subroutines #6 and #7 are respectively inserted into the beginning part and the ending part of each parallel processing library routine.

[S6] A statement to call run-time subroutine #8 is inserted into the ending part of the main program body.

[S7] The compilation system translates (or compiles) the source code file 15, which now has the subroutine call statements inserted in step S2 to S6, into object code that is executable by the processors 12a–12n.

By executing the above-described steps S1 to S7, the compilation system inserts some appropriate statements into the source code file 15 to invoke the run-time subroutines for data collection and summarization, and it compiles the source code file 15 to generate executable object code. As a result, the generated object code has subroutine call instructions at both starting and ending points of the main program body, procedures, loops, and parallel processing library routines.

FIG. 3 summarizes the run-time subroutines inserted for the purpose of performance monitoring and analysis. Table 30 briefly describes the functions of eight run-time subroutines and their respective occasions at which they are invoked.

The first seven subroutines (#1 to #7) listed in this table are subroutines designed for collecting time-stamp data and accumulating the execution time of each portion of the parallel program. That is, those subroutines #1–#7 correspond to the data collection means 13a–13n in FIG. 1. The eighth subroutine (#8) is a subroutine designed for summarizing the data that are collected and accumulated by the subroutines #1 to #7. The subroutine #8 thus corresponds to the data summarization means 14a–14n.

Referring now to FIGS. 4 to 11, the following will explain about detailed functions of the run-time subroutines #1–#8 inserted to the source code.

FIG. 4 is a flowchart showing the run-time subroutine #1, which is called up when the program starts to run and provides the following two tasks.

[S11a] Initializing a local data area to be used to record and analyze the processor behavior.

[S11b] Recording the program start time.

Figure 5:
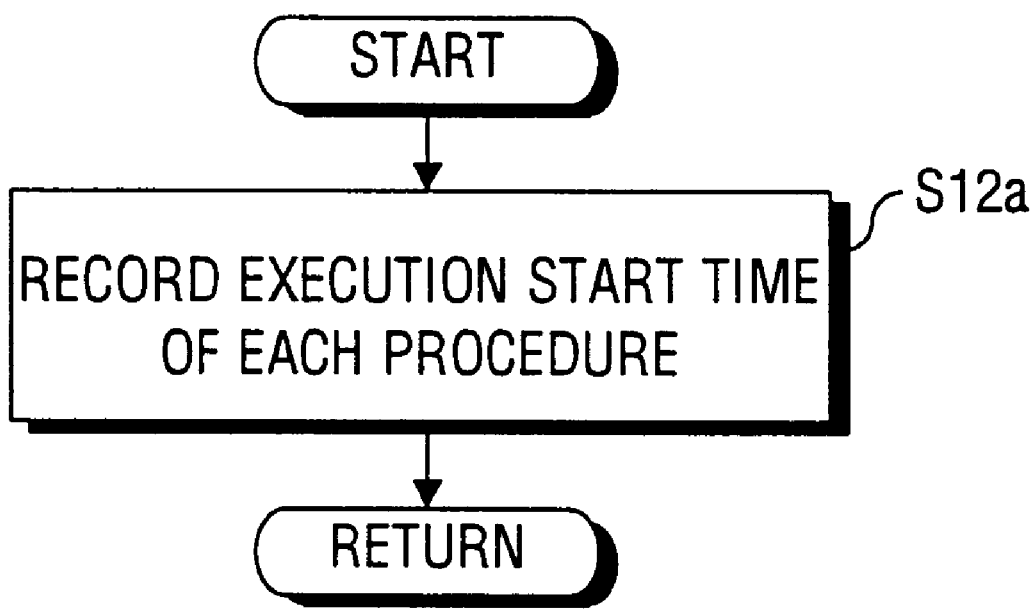
FIG. 5 is a flowchart describing functions of run-time subroutine #2.
Figure 6:
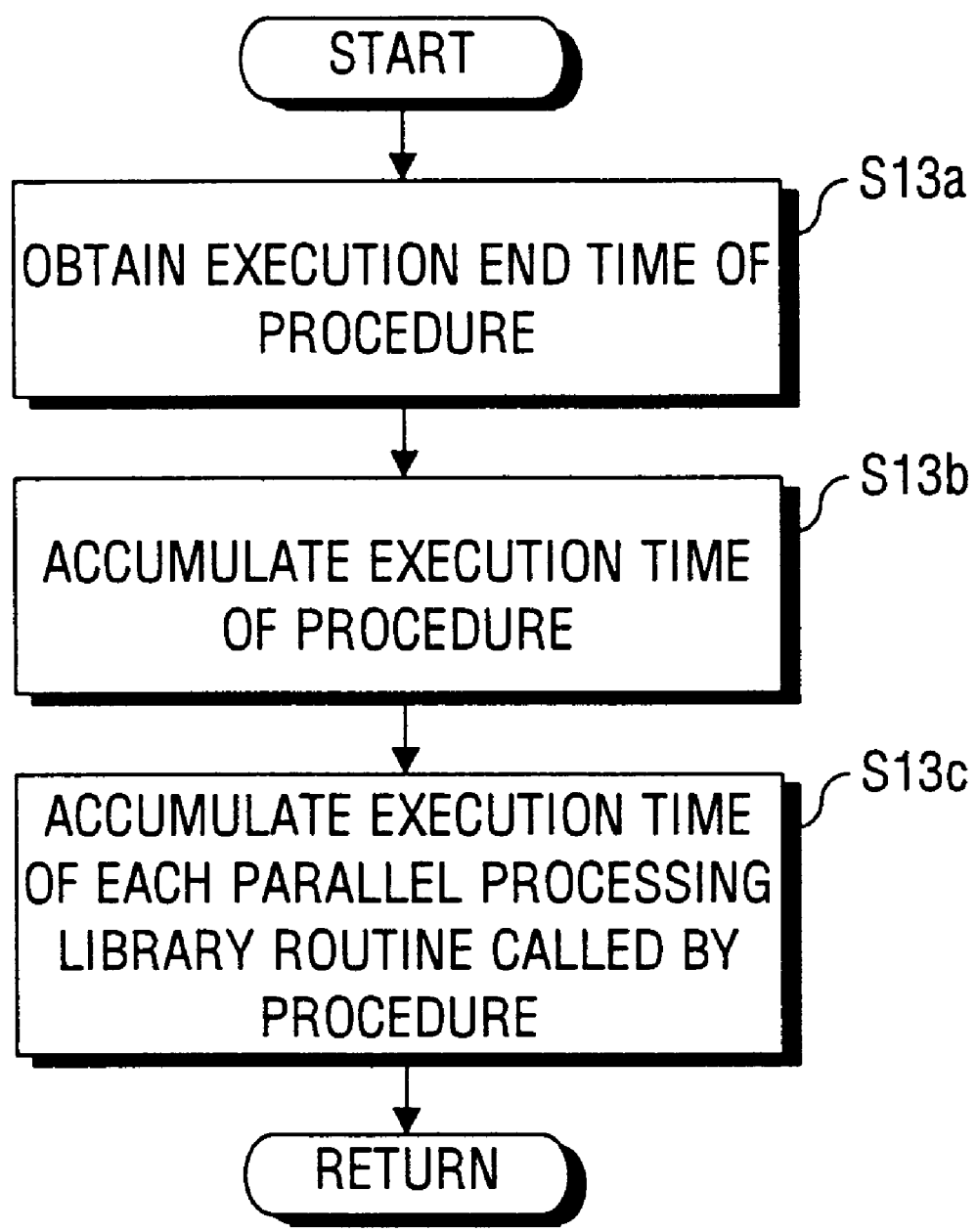
FIG. 6 is a flowchart describing functions of run-time subroutine #3.

FIGS. 5 and 6 are flowcharts showing the run-time subroutines #2 and #3, respectively. The run-time subroutine #2 is invoked at the beginning of each procedure, and as shown in step S12a of FIG. 5, it records the execution start time of that procedure. Serving as the counterpart of this subroutine #2, the run-time subroutine #3 is invoked when the procedure is finished and performs the following three tasks:

[S13a] Obtaining the execution end time of the procedure.

[S13b] Accumulating the execution time of the procedure (i.e., accumulating the difference between the execution start time and the execution end time).

[S13c] Accumulating the execution time of each parallel processing library routine called by the procedure (i.e., accumulating the difference between the execution start time and the execution end time recorded by the run-time subroutines #6 and #7 for each parallel processing library routine).

Figure 7:
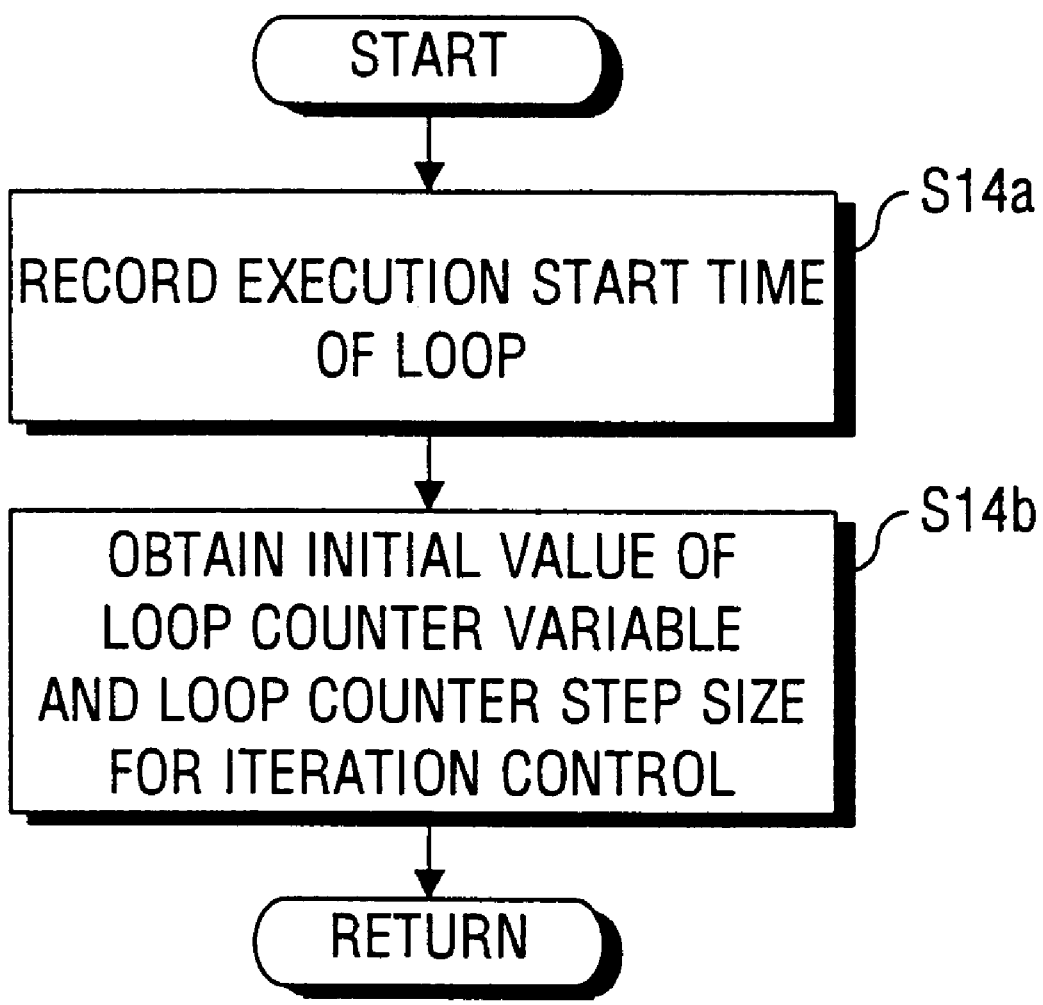
FIG. 7 is a flowchart describing functions of run-time subroutine #4.

FIG. 7 shows a flowchart of the run-time subroutine #4, which is invoked when the processor goes into a loop. Loop is a sequence of instructions which is executed iteratively under the control of a loop counter variable. Each time the loop is executed, the loop counter variable is increased (or decreased) by a predetermined increment, and the loop is repeated until the loop counter variable reaches a prescribed limit value or other terminal conditions are met. To collect execution statistics data for the loops, the run-time subroutine #4 performs the following two tasks:

[S14a] Recording the execution start time of the loop.

[S14b] Obtaining the initial value of the loop counter variable and the increment (or loop counter step size) for each iteration, and saving them for future use.

Figure 8:
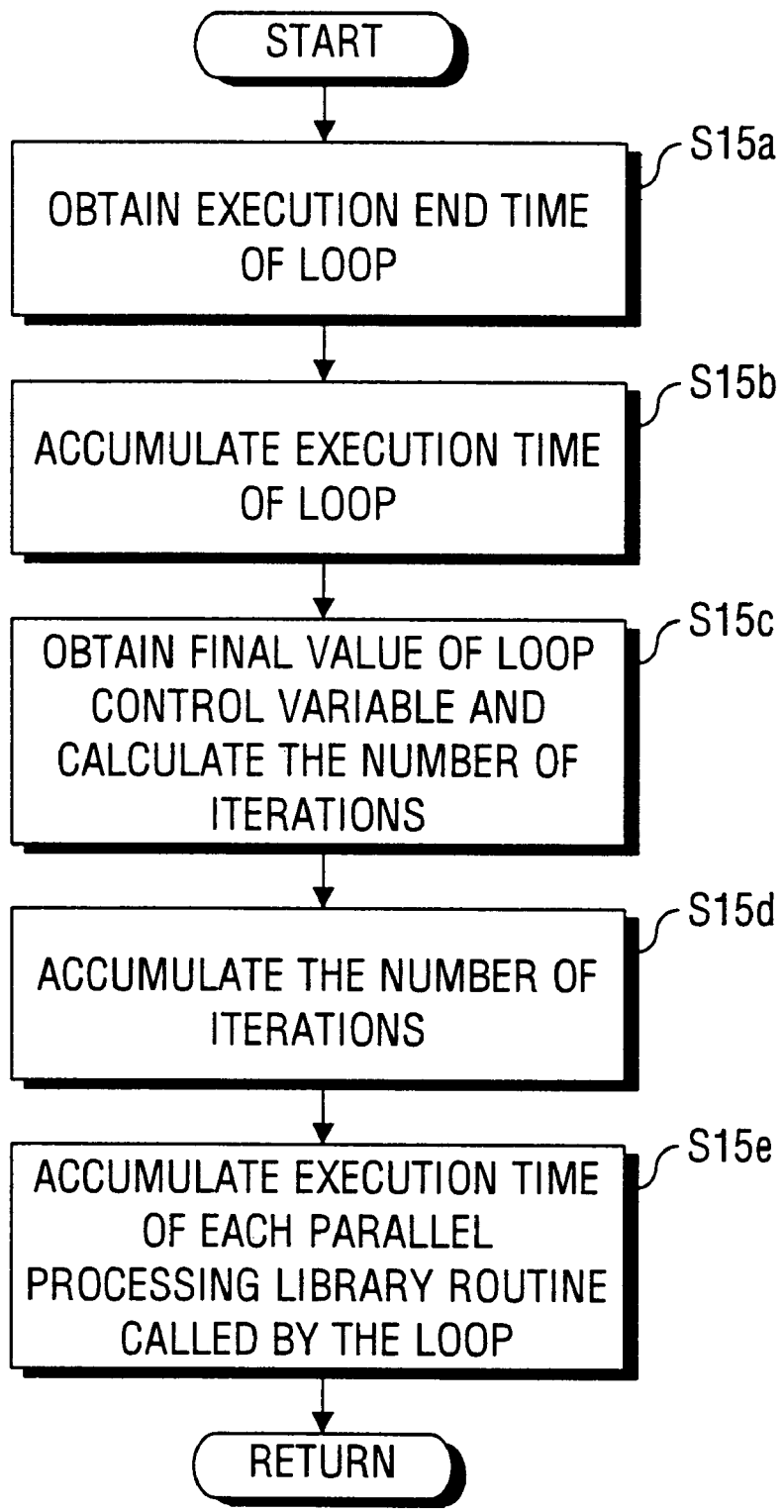
FIG. 8 is a flowchart describing functions of run-time subroutine #5.

FIG. 8 shows a flowchart of the run-time subroutine #5 which is executed when a loop is terminated. It provides the following four tasks for each loop.

[S15a] Obtaining the execution end time of the loop.

[S15b] Accumulating the execution time of the loop (i.e., accumulating the difference between the execution start time and the execution end time for the loop).

[S15c] Obtaining the final value of the loop control variable and calculating the number of iterations based on the initial and final values of the loop counter variable and the step size.

[S15d] Accumulating the number of iterations.

[S15e] Accumulating the execution time of each parallel processing library routine called by the loop. Here, the execution time is obtained by subtracting the execution start time from the execution end time which are recorded by the run-time subroutines #6 and #7 for each parallel processing library routine called from the loop.

Figure 9:
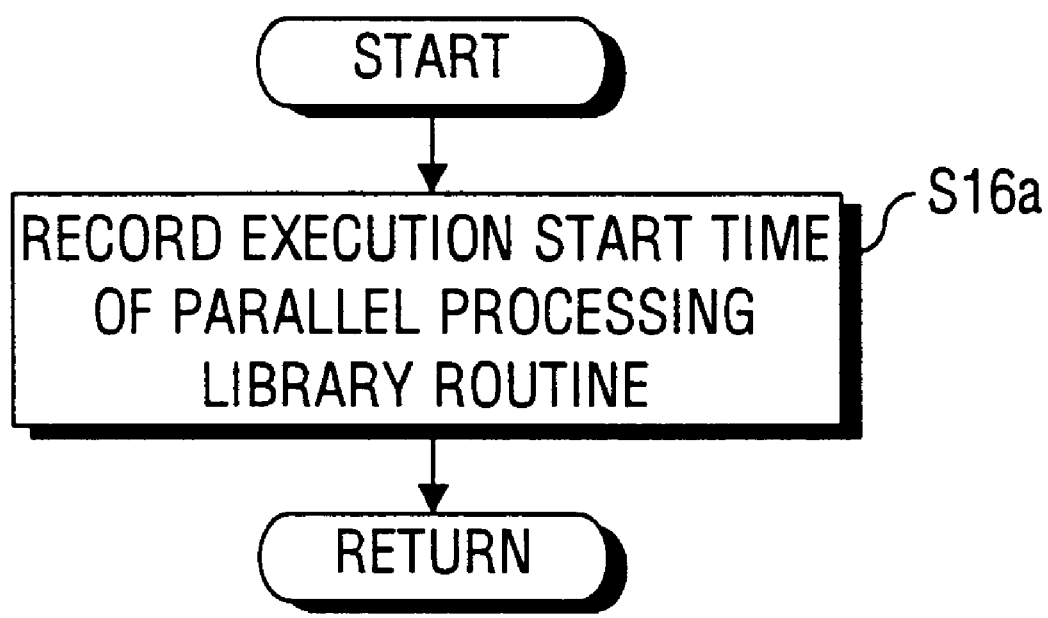
FIG. 9 is a flowchart describing functions of run-time subroutine #6.

FIGS. 9 and 10 show the run-time subroutines #6 and #7, which are called up when a parallel processing library routine starts and ends, respectively. That is, the run-time subroutine #6 performs the step of:

[S16a] Recording the execution start time of the parallel processing library routine.

As the counterpart of this run-time subroutine #6, the run-time subroutine #7 provides:

[S17a] Obtaining the execution end time of the parallel processing library routine.

[S17b] Accumulating the execution time of the parallel processing library routine, where the execution time is the difference between the execution start time recorded in step S16a and the execution end time obtained in step S17a.

FIG. 11 is a flowchart showing the run-time subroutine #8, which is executed at the end of the whole program. This run-time subroutine #8 summarizes the execution time data collected by the other run-time subroutines #1 to #7, according to the following steps:

[S18a] Calculating the average accumulated time of each parallel processing library routine called by each procedure according to the equations as:

$$Tcp(avg) = \frac{1}{n}\sum_{m=1}^{n} Tcp(m) \tag{1}$$

$$Twp(avg) = \frac{1}{n}\sum_{m=1}^{n} Twp(m) \tag{2}$$

$$Top(avg) = \frac{1}{n}\sum_{m=1}^{n} Top(m) \tag{3}$$

where n is an integer representing the number of processors involved in the parallel computing system 11 and m is an integer, ranging from 1 to n, used to indicate a specific processor. Tcp (m) is the accumulated execution time that the m-th processor spent for communication tasks. Tcp (avg) means an average accumulated execution time spent for communication tasks. Twp(m) is the accumulated execution time that the m-th processor spent for synchronization. Twp (avg) means an average accumulated execution time spent for synchronization tasks. Top (m) is the accumulated execution time that the m-th processor spent for tasks other than the communication and synchronization tasks. Top(avg) means the average accumulated execution time spent for the other tasks.

[S18b] Calculating the maximum value, minimum value, and standard deviation σ for each of the accumulated execution times Tcp(m), Twp(m), and Top(m).

[S18c] Calculating the average accumulated execution time of user program according to the equation as:

$$Tup(avg) = \frac{1}{n}\sum_{m=1}^{n} Tup(m) \qquad (4)$$
$$= \frac{1}{n}\sum_{m=1}^{n} (Tpp(m) - Tcp(m) - Twp(m) - Top(m))$$

where Tpp(m) is the execution time spent by the m-th processor for the procedure concerned, and Tup(m) is the net execution time of user program.

$$Tup(m) = Tpp(m) - Tcp(m) - Twp(m) - Top(m) \qquad (5)$$

[S18d] Calculating the maximum value, minimum value, and standard deviation σ for the accumulated execution time of user program Tup(m).

[S18e] Calculating the average accumulated time of each parallel processing library routine called in each loop according to the equations as:

$$Tcl(avg) = \frac{1}{n}\sum_{m=1}^{n} Tcl(m) \qquad (6)$$

$$Twl(avg) = \frac{1}{n}\sum_{m=1}^{n} Twl(m) \qquad (7)$$

$$Tol(avg) = \frac{1}{n}\sum_{m=1}^{n} Tol(m) \qquad (8)$$

Tcl(m) is the accumulated execution time that the m-th processor spent for communication tasks. Tcl(avg) means the average accumulated execution time spent for communication tasks. Twl(m) is the accumulated execution time that the m-th processor spent for synchronization. Twl(avg) means the average accumulated execution time spent for synchronization tasks. Tol (m) is the accumulated execution time that the m-th processor spent for tasks other than the communication and synchronization tasks. Tol(avg) means the average accumulated execution time spent for the other tasks.

[S18f] Calculating the maximum value, minimum value, and standard deviation σ for each of the accumulated execution times Tcl(m), Tvl(m), and Tol(m).

[S18g] Calculating the average accumulated execution time of user program according to the equation as:

$$Tul(ave) = \frac{1}{n}\sum_{m=1}^{n} Tul(m) \qquad (9)$$
$$= \frac{1}{n}\sum_{m=1}^{n} (Tpl(m) - Tcl(m) - Twl(m) - Tol(m))$$

where Tpl(m) is the execution time spent by the m-th processor for the loop concerned, and Tul(m) is the net accumulated execution time of user program.

$$Tul(m) = Tpl(m) - Tcl(m) - Twl(m) - Tol(m) \qquad (10)$$

[S18h] Calculating the maximum value, minimum value, and standard deviation σ for the accumulated execution time of user program Tul(m).

[S18i] Outputting the results of steps S18a to S18h as a profile information file 16.

FIG. 12 shows a table that summarizes the information collected by the performance analyzer system of the present invention. In this table 40, the collected information is classified according to the subject of profiling operations including procedures, loops, and parallel processing library routines to support communication, synchronization, and other tasks. While being not shown in FIG. 12, conditional branches can also be included in the profile subject.

Generally, information concerning the program behavior in each processor is collected at three different stages of execution: preparatory process stage, start-up process stage, and terminal process stage.

Preparatory process stage is a stage before a routine designated as the profile subject is invoked. The three kinds of profile subjects listed in table 40, however, require no information to be collected at the preparatory process stage. As mentioned above, conditional branches (not shown in FIG. 7) can also be a target of the execution profiling. When it is the case, additional instructions are inserted to the source code to invoke another run-time subroutine to collect information on actual branch conditions taken. Specifically, such branch conditions include "true or false" conditions as a result of logical operations or "negative, zero, or positive" conditions as a result of arithmetic operations executed prior to branch instructions. The run-time subroutine counts occurrences of each of those conditions before branching is made, namely, at the preparatory process stage.

Start-up process stage is a stage at which a routine involved as a profile subject starts to run. More specifically, the execution start time is recorded at the start-up process stage of each procedure (see S12a in FIG. 5), loop (see S14a in FIG. 7), or parallel processing library routine (see S16a in FIG. 9). In the case of the loops, the initial value of a loop counter variable and a loop counter step size are recorded in addition to the execution start time (see S14b in FIG. 7).

Terminal process stage is a stage at which a routine is about to end. At the terminal process stage of each procedure, the execution time of the procedure and the execution time of each parallel processing library routine called within the procedure are accumulated (see S13b and S13c in FIG. 6), thereby obtaining the accumulated execution times Tpp(m), Tcp(m), Twp(m), and Top(m). Similarly, at the terminal process stage of a loop, the execution time of the loop and the execution time of each parallel processing library routine called within the loop are accumulated (see S15b and S15e in FIG. 8), thereby obtaining the accumulated execution times Tpl(m), Tcl(m), Twl(m), and Tol(m) for the loop. In addition, at the terminal process stage of each loop, the number of iterations is also accumulated. Regarding the parallel processing library routines, the execution time of each routine is accumulated at the terminal process stage (see S17b in FIG. 10).

The information collected at the above-described three process stages is summarized at the end of the program and then output as a profile information file 16. Retrieving the summarized information from the profile information file 16, the profile display processor 17 presents execution profile summaries to the user of this system. To provide the user with comprehensive and informative display, the profile display processor 17 uses various visualization methods described below.

Figure 13:
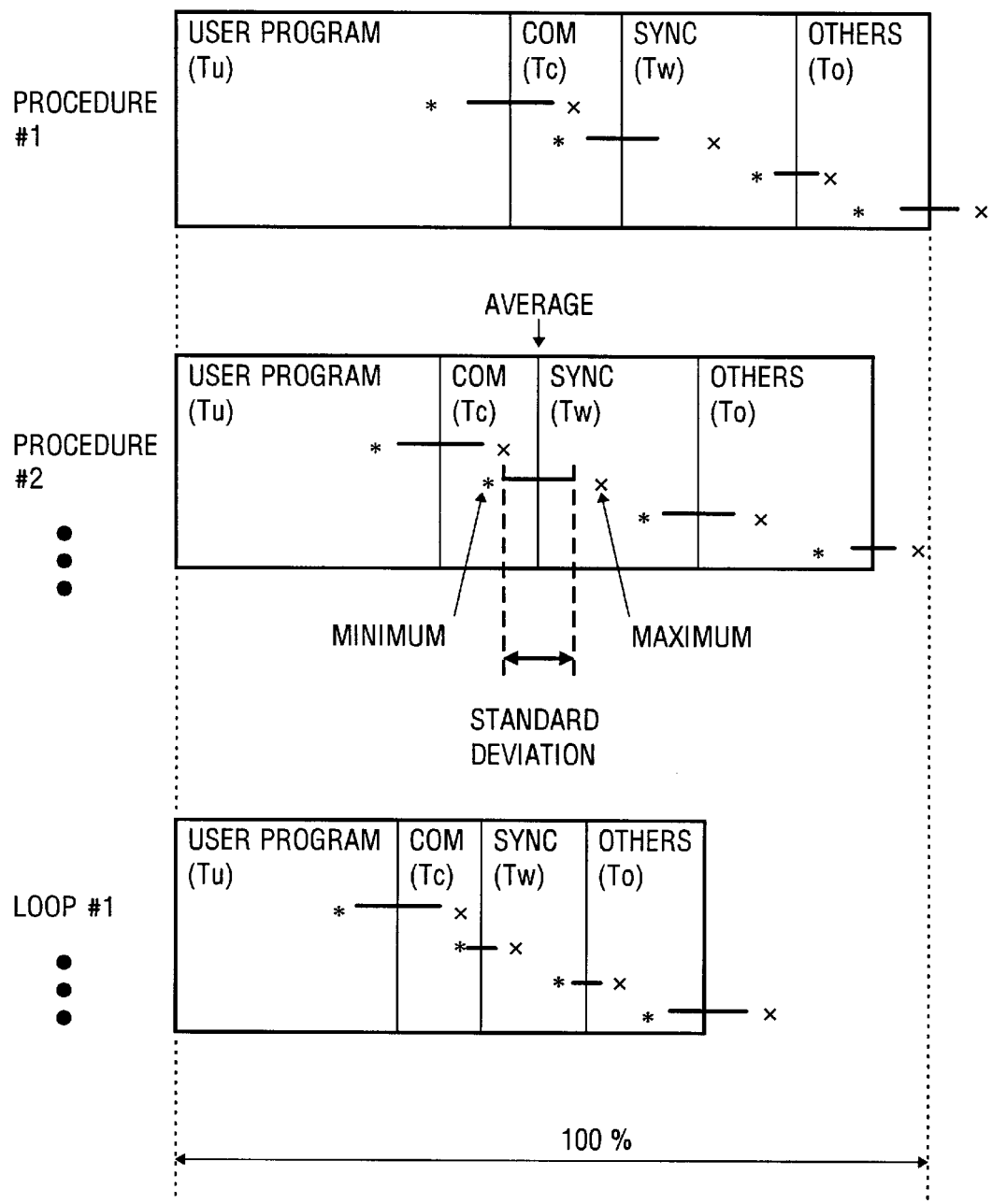
FIG. 13 is a diagram showing a first example of execution profile display according to the present invention, in which each procedure or loop is scaled in reference to the execution time of an entire program.

FIG. 13 is a diagram showing a first example of execution profile display according to the present invention. In this case, procedure #1 is the main body of a parallel processing program under test, and the bar graphs for the other procedures and loops are scaled with respect to the execution time of the procedure #1 (i.e., the execution time of the entire program).

The execution profile display illustrated in FIG. 13 includes information on procedures #1, #2, and so on and loops #1, #2, and so on. Each bar graph is partitioned into four parts: user program execution time Tu, communication task execution time Tc, synchronization task execution time Tw, and other task execution time To. The partitioning is performed by the profile display processor 17, according to the average values of the accumulated execution times.

Furthermore, the results of statistic analysis for each execution time category are overlaid on the bar graphs, where the minimum values are represented with an asterisk "*", the maximum values with a symbol "x", and the standard deviations with a horizontal line segment drawn between them.

Such a straightforward display of the execution statistics will allow the user to easily understand the relationship between the user program and parallel-processing overheads including communication and synchronization tasks. Moreover, with the provision of maximum, minimum, and standard deviation symbols, the user can learn at a glance how the percentages actually fluctuate. This feature will greatly help the user to understand the behavior of procedures and loops contained in a parallel processing program, thus enabling him/her to observe whether the program is working properly or not and to decide whether further program modification is required or not for performance improvement.

Figure 14:
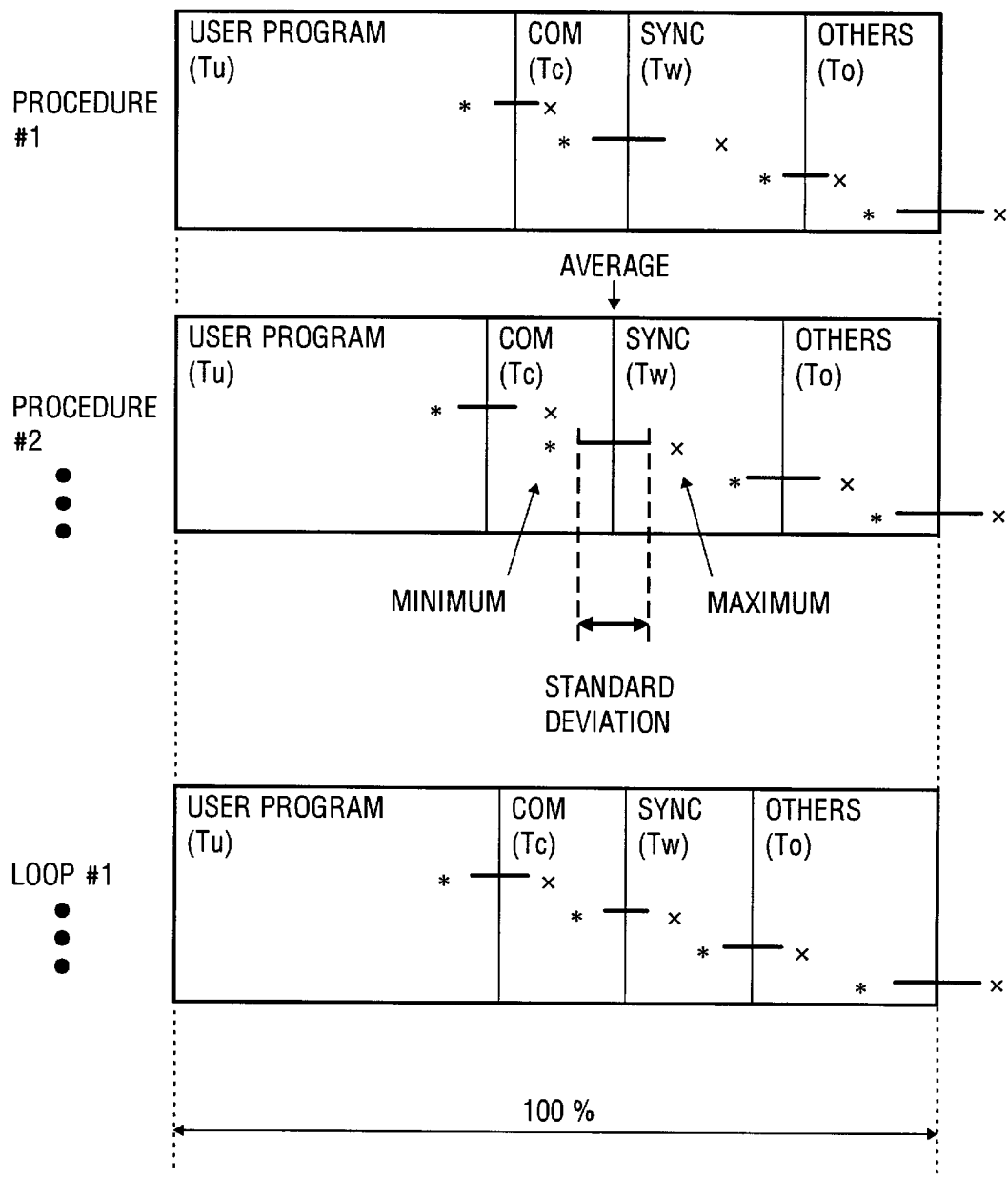
FIG. 14 is a diagram showing a second example of execution profile display, in which all procedures and loops are equally scaled regardless of their absolute execution times.

FIG. 14 is a diagram showing a second example of execution profile display. Unlike the first example shown in FIG. 13, this second example method visualizes all procedures and loops in the individual time scales regardless of their absolute execution times. That is, the lengths of the bar graphs are not proportional to their respective execution time lengths. The graphs in FIG. 14, however, allows the user to easily understand the percentages of program components (i.e., user program Tu, communication task Tc, synchronization task Tw, and other tasks To) involved in each procedure or loop.

Figure 15A:
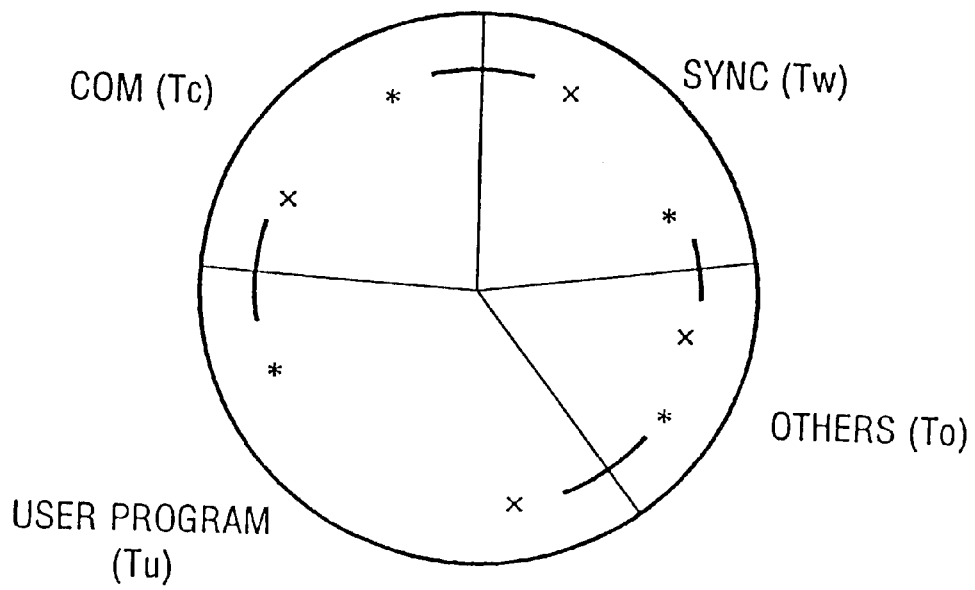
FIG. 15 is a diagram showing a third example of execution profile display, in which execution profile of each procedure or loop is represented in a pie graph.
Figure 15B:
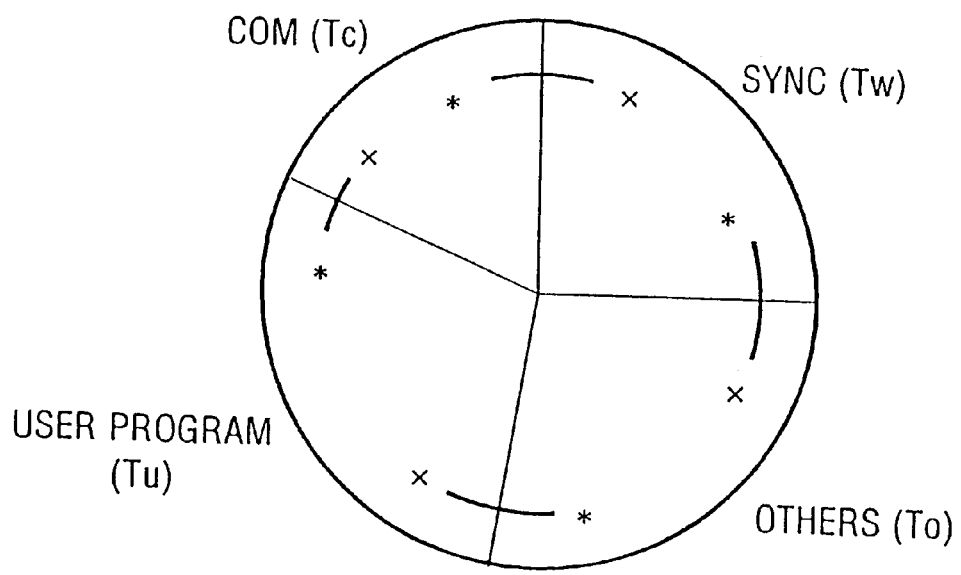

FIG. 15 shows a third example of execution profile display, in which two procedures #1 and #2 are represented in the form of a pie graph. Pie graphs generally allow the user to compare the relationship of components to a whole more easily. In this third display method, a whole pie of 360 degrees shows the total accumulated execution time of a procedure or loop, and four sectors indicate the percentages of user program execution time (Tu), communication task execution time (Tc), synchronization task execution time (tw), and other task execution time (To).

FIG. 16 shows a fourth example of execution profile display, in which the execution profile is represented in the form of a radar chart. The radar chart in FIG. 16 has four axes corresponding to the four program components. The accumulated execution time values (Tu, Tc, Tw, and To) of the program components are plotted on their respective axes, and the plotted points are connected to each other to form a polygon. From the shape of this polygon, the user can intuitively understand the characteristics of the procedure or loop profiled in a radar chart.

Similar to the other display methods described so far, the radar chart illustrated in FIG. 16 includes information on the minimum and maximum values and standard deviation of the accumulated execution time. This feature allows the user to learn the behavior of each program component at a more detailed level.

Figure 17:
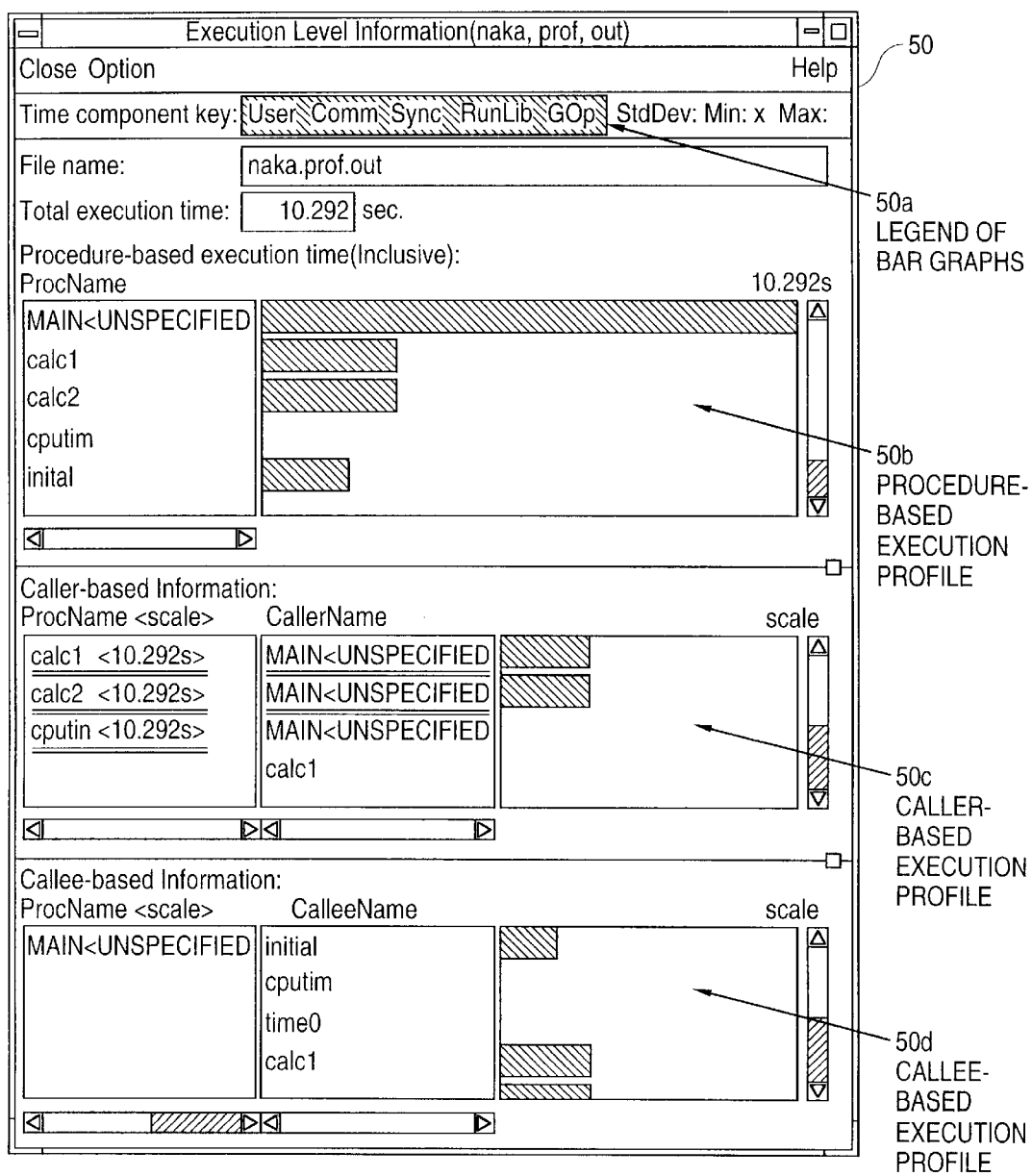
FIG. 17 is a diagram showing a fifth example of execution profile display according to the present invention.

FIG. 17 shows a fifth example of execution profile display according to the present invention. An execution profile window 50 consists of four sections 50a to 50d. The first section 50a provides the legend of bar graphs displayed in the other sections of the window 50. More specifically, the legend defines color classification for four different program components labeled as:

User: user program.

Com: communication task routine.

Sync: synchronization task routine.

Runlib and Gop: other routines.

The execution profile window 50 in the fifth example uses this color classification along with the visualization method as in FIG. 13.

The second section 50b of the execution profile window 50 shows a procedure-based execution profile which summarizes the accumulated execution times of several procedures such as "MAIN," "calc1," "calc2," "cputim," and "inital."

The third section 50c of the execution profile window 50 shows a caller-based execution profile which summarizes the accumulated execution time of each procedure together with the name of its caller routine. For example, the top line of this section reads as follows:

calc1 <10.292s> MAIN <UNSPECIFIED where the leftmost label "calc1" is the name of procedure that is called by a caller routine "MAIN." The rightmost tag "<UNSPECIFIED" means that the caller routine does not declare its own program name and the inherent name "MAIN" is used by the analyzer system. The line also indicates that the accumulated execution time of this procedure "calc1" is 10.292 seconds.

The bar graph for this "calc1" procedure is color-classified according to the legend defined in the first section 50a, where four parts of the bar graph respectively shows the accumulated execution times Tu, Tc, Tw, and To, along with the indication of minimum, maximum, and standard deviation.

The fourth section 50d of the execution profile window 50 provides a callee-based execution profile. For example, the top line of the section 50d reads as follows:

MAIN <UNSPECIFIED inital where the label "MAIN <UNSPECIFIED" shows the name of a caller routine and the other label "inital" indicates the name of a callee procedure. The bar graph for this "inital" procedure is color-classified according to the legend defined in the first section 50a. It consists of four parts that respectively show the accumulated execution times Tu, Tc, Tw, and To, as well as indicating their minimum and maximum values and standard deviation with the aforementioned symbols.

Figure 18:
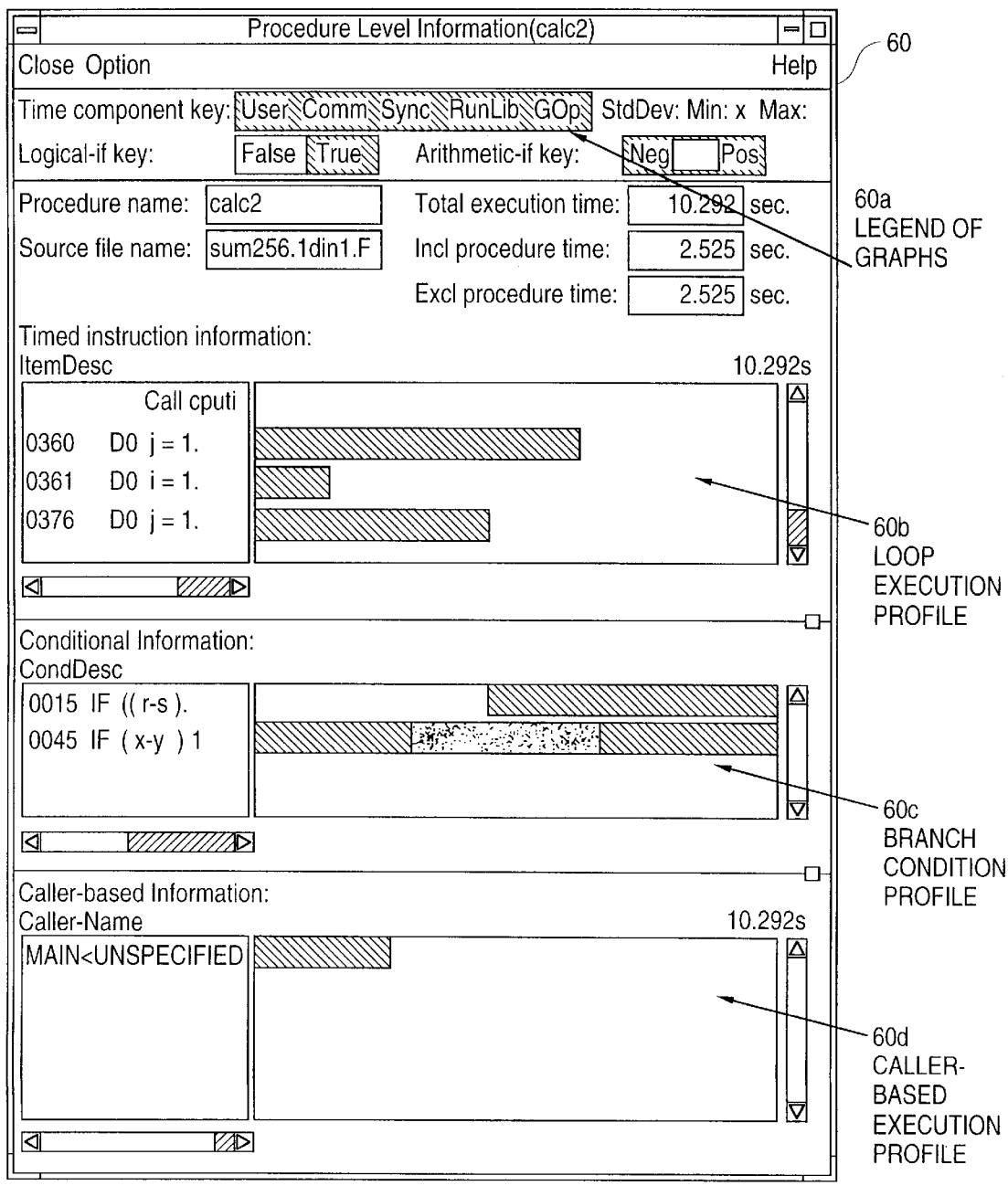
FIG. 18 is a diagram showing a sixth example of execution profile display according to the present invention.

FIG. 18 is a sixth example of execution profile display according to the present invention. An execution profile window 60 consists of four sections 60a to 60d. The first section 60a provides the legend of bar graphs displayed in the other sections of the window 60, and more specifically, it defines color classification for four program components labeled as:

User: user program.

Com: communication task routine.

Sync: synchronization task routine.

Runlib and Gop: other routines.

The legend also involves color classification for branch conditions, which includes "true" and "false" conditions for logical operations and "negative," "zero," and "positive" conditions for arithmetic operations.

The second section 60b of the execution profile window 60 shows an execution profile which summarizes the accumulated execution times of several loops.

The third section 60c of the execution profile window 50 shows an execution profile which summarizes the branch conditions. The upper bar graph in the third section 60c visualizes the percentages of "true" conditions and "false" conditions that actually occurred as a result of logical operations. The lower bar graph visualizes the percentages of "positive," "zero," and "negative" conditions that actually occurred as a result of arithmetic operations.

The fourth section 60d of the execution profile window 60 provides a callee-based execution profile, which is the same as the third section 50c in FIG. 17.

In summary for FIGS. 12 to 17, the present embodiment presents the results of performance analysis using a variety of visualization methods. Besides being capable of displaying average execution time of each subject routine, the present analyzer system shows the maximum, minimum, and standard deviation of the execution times, thereby allowing the user to learn at a glance how the percentages actually fluctuate.

In the present embodiment, the performance analyzer system analyzes the parallel computing system 11 (see FIG. 1) consisting of multiple processors #1 to #n. The present invention, however, can also be applied to a single processor system which performs multiple tasks by using a time sharing method. In that case, several appropriate run-time subroutines will collect execution data for individual processes or modules which are running virtually in parallel, and the performance analyzer system summarizes the collected data and displays the results as execution profiles. As in the present embodiment, the execution profile displayed on a screen will show average, minimum, and maximum execution times and standard deviation from the average value, with respect to the subject processes or modules.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of visualizing results of performance monitoring and analysis for a parallel computing system in which a plurality of processors concurrently execute a parallel processing program composed of a plurality of routines, the method comprising:

collecting from the plurality of processors, execution time records for each routine being executed concurrently by the plurality of processors, in consideration of classification of the routines;

obtaining a maximum value, an average value, a minimum value, and standard deviation of the execution time records of each routine collected from the plurality of processors, based on the information collected for the plurality of processors; and graphically displaying execution profile information including the maximum value, the average value, the minimum value, and the standard deviation of the execution time of each routine.

2. A method according to claim 1, wherein said collecting accumulates the execution time of each routine each time the routine is invoked and executed.

3. A method according to claim 1, wherein said collecting collects the execution time of each routine that is designated as a subject of profiling.

4. A method according to claim 1, wherein said collecting classifies the routines into user program, communication tasks, synchronization tasks, and other tasks.

5. A method according to claim 3, wherein the subject of profiling includes procedures, loops, and parallel processing library routines.

6. A method according to claim 1, wherein said graphically displaying extracts at least one of caller routines and callee routines from among the routines in the parallel processing program and displays the execution profile information pertaining to the routines extracted.

7. A method according to claim 1, wherein said graphically displaying uses a bar graph to graphically display the execution profile information of each routine.

8. A method according to claim 1, wherein said graphically displaying uses a pie graph to graphically display the execution profile information of each routine.

9. A method according to claim 1, wherein said graphically displaying uses a radar chart to graphically display the execution profile information of each routine.

10. A method according to claim 1, further comprising:

accepting a designation of an item of the execution profile information displayed by said graphically displaying, and displaying a part of source code of the parallel processing program which corresponds to the item designated in the execution profile information.

11. A computer-readable medium encoded with a computer program in which the method as recited in claim 1 is implemented.

* * * * *